US012651785B2

(12) United States Patent
Butcher

(10) Patent No.: US 12,651,785 B2
(45) Date of Patent: Jun. 9, 2026

(54) THERMAL MANAGEMENT OF BATTERY SYSTEMS

(71) Applicant: BP P.L.C., London (GB)

(72) Inventor: Richard Thomas Butcher, Reading (GB)

(73) Assignee: BP P.L.C., London (GB)

( * ) Notice: Subject to any disclaimer, the term of this patent is extended or adjusted under 35 U.S.C. 154(b) by 837 days.

(21) Appl. No.: 17/791,842

(22) PCT Filed: Dec. 1, 2020

(86) PCT No.: PCT/EP2020/084181

§ 371 (c)(1),
(2) Date: Jul. 8, 2022

(87) PCT Pub. No.: WO2021/139927

PCT Pub. Date: Jul. 15, 2021

(65) Prior Publication Data

US 2023/0066067 A1 Mar. 2, 2023

(30) Foreign Application Priority Data

Jan. 10, 2020 (GB) ..................................... 2000389

(51) Int. Cl.
*H01M 10/6568* (2014.01)
*H01M 10/44* (2006.01)
(Continued)

(52) U.S. Cl.
CPC ....... *H01M 10/6568* (2015.04); *H01M 10/44* (2013.01); *H01M 10/613* (2015.04);
(Continued)

(58) Field of Classification Search
CPC ............. H01M 10/6568; H01M 10/44; H01M 10/613; H01M 10/63; H01M 10/6552; H01M 10/6557
See application file for complete search history.

(56) References Cited

U.S. PATENT DOCUMENTS 7,890,218 B2 2/2011 Adams et al.
8,852,772 B2 10/2014 McDonald
(Continued)

FOREIGN PATENT DOCUMENTS

CN 1285087 2/2001
CN 102237561 11/2011
(Continued)

OTHER PUBLICATIONS

Huang Kanfeng, Chen Caimin, Lin Chutong; Vortex Tube Thermal Management System for Power Batteries Based On Braking Energy Storage; Storage Battery, No. 5; pp. 5-8+18; Oct. 20, 2018.
(Continued)

*Primary Examiner* — Ula C Ruddock
*Assistant Examiner* — Sydney L Kline
(74) *Attorney, Agent, or Firm* — McDonnell Boehnen Hulbert & Berghoff LLP

(57) ABSTRACT

A battery system has a plurality of battery cells including a first battery cell. Each battery cell includes a casing enclosing an anode and a cathode. The battery system also includes a first fluid circulation system with a plurality of fluid conduits including a first fluid conduit that is adjacent to the first battery cell, where the first fluid circulation system is configured to circulate a first fluid through the battery system in a first direction. The battery system also includes a second fluid circulation system with a plurality of fluid conduits including a first fluid conduit that is adjacent to the first fluid conduit of the first fluid circulation system. The (Continued)

second fluid circulation system is configured to circulate a second fluid through the battery system in a second direction that is opposite the first direction.

12 Claims, 7 Drawing Sheets

(51) Int. Cl.
    *H01M 10/613*     (2014.01)
    *H01M 10/63*     (2014.01)
    *H01M 10/647*     (2014.01)

(52) U.S. Cl.
    CPC ......... *H01M 10/63* (2015.04); *H01M 10/647* (2015.04); *H01M 2220/20* (2013.01)

(56)           References Cited

U.S. PATENT DOCUMENTS

| | | | |
|---|---|---|---|
| 9,731,621 B2 | 8/2017 | Rawlinson | |
| 10,252,597 B2 | 4/2019 | Wallace et al. | |
| 10,263,301 B2 | 4/2019 | Kenney et al. | |
| 11,214,155 B2 | 1/2022 | Zies et al. | |
| 2009/0024256 A1 | 1/2009 | Adams et al. | |
| 2010/0104938 A1 | 4/2010 | Hermann | |
| 2010/0138092 A1 | 6/2010 | Kohn | |
| 2011/0206969 A1 | 8/2011 | Tennessen et al. | |
| 2011/0212356 A1 | 9/2011 | Tennessen et al. | |
| 2011/0262794 A1* | 10/2011 | Yoon ................. | H01M 10/6567 |
| | | | 429/120 |
| 2012/0021258 A1 | 1/2012 | Kelty et al. | |
| 2012/0045681 A1 | 2/2012 | Klaus et al. | |
| 2013/0078494 A1 | 3/2013 | Herman | |
| 2013/0196184 A1 | 8/2013 | Faas et al. | |
| 2013/0280561 A1* | 10/2013 | Tolkacz ................. | B60L 50/15 |
| | | | 429/50 |
| 2014/0088809 A1 | 3/2014 | Herman et al. | |
| 2014/0178719 A1 | 6/2014 | Storc et al. | |
| 2014/0193683 A1* | 7/2014 | Mardall ................... | B60K 1/04 |
| | | | 429/99 |
| 2015/0054460 A1* | 2/2015 | Epstein ................... | B60L 58/27 |
| | | | 320/109 |
| 2015/0191101 A1 | 7/2015 | Rawlinson | |
| 2015/0244047 A1 | 8/2015 | Straubel | |
| 2015/0270530 A1* | 9/2015 | Thoennessen ...... | H01M 50/636 |
| | | | 29/623.2 |
| 2016/0315365 A1 | 10/2016 | Vanderweens et al. | |
| 2017/0110770 A1* | 4/2017 | Marcicki ............. | H01M 10/625 |
| 2017/0373359 A1 | 12/2017 | Krull et al. | |
| 2018/0205125 A1 | 7/2018 | Burgers et al. | |
| 2018/0254470 A1 | 9/2018 | Leport et al. | |
| 2018/0289996 A1 | 10/2018 | Kim et al. | |

FOREIGN PATENT DOCUMENTS

| | | | | | |
|---|---|---|---|---|---|
| CN | 202076386 U | | 12/2011 | | |
| CN | 102437370 A | | 5/2012 | | |
| CN | 205194809 U | | 4/2016 | | |
| CN | 105846009 A | | 8/2016 | | |
| CN | 205543154 U | | 8/2016 | | |
| CN | 106410322 A | | 2/2017 | | |
| CN | 107658523 | | 2/2018 | | |
| CN | 107749505 A | | 3/2018 | | |
| CN | 109346795 A | | 2/2019 | | |
| CN | 208706806 U | | 4/2019 | | |
| CN | 110462921 | | 11/2019 | | |
| CN | 110556610 | | 12/2019 | | |
| CN | 110556610 A | * | 12/2019 | ......... | H01M 10/613 |
| DE | 102013014903 A1 | | 3/2015 | | |
| EP | 3062381 A1 | | 8/2016 | | |
| EP | 3125357 A1 | | 2/2017 | | |
| EP | 2 226 887 B1 | | 4/2017 | | |
| FR | 2974541 B1 | | 11/2012 | | |
| JP | H07304338 | | 11/1995 | | |
| JP | 2008251263 | | 10/2008 | | |
| JP | 2008251263 A | * | 10/2008 | | |
| JP | 2009037934 A | | 2/2009 | | |
| JP | 2009170370 | | 7/2009 | | |
| JP | 2009289610 A | | 12/2009 | | |
| JP | 2011146320 A | | 7/2011 | | |
| JP | 2015072741 A | * | 4/2015 | | |
| JP | 2017147128 A | | 8/2017 | | |
| JP | 6405912 B2 | | 10/2018 | | |
| JP | 6443298 B2 | | 12/2018 | | |
| KR | 101560556 B1 | | 10/2015 | | |
| WO | 9856047 | | 12/1998 | | |
| WO | 2008156737 A1 | | 12/2008 | | |
| WO | 2009029138 A2 | | 3/2009 | | |
| WO | WO-2018045013 A1 | * | 3/2018 | ......... | B60H 1/00278 |
| WO | 2018107926 A1 | | 6/2018 | | |
| WO | 2018137374 A1 | | 8/2018 | | |
| WO | 2018149468 A1 | | 8/2018 | | |
| WO | 2018150258 A1 | | 8/2018 | | |
| WO | 2018150272 A1 | | 8/2018 | | |
| WO | 2018150277 | | 8/2018 | | |
| WO | WO-2018184309 A1 | * | 10/2018 | ......... | H01M 10/613 |
| WO | 2019006204 A1 | | 1/2019 | | |
| WO | 2019014960 A1 | | 1/2019 | | |
| WO | 2019020639 A1 | | 1/2019 | | |
| WO | 2019034485 A1 | | 2/2019 | | |
| WO | 2019138176 A1 | | 7/2019 | | |
| WO | WO-2019197759 A1 | * | 10/2019 | ............. | B60L 58/26 |

OTHER PUBLICATIONS

Pesaran, "Battery Thermal Management in EVs and HEVs: Issues and Solutions", Advanced Automotive Battery Conference; Las Vegas, Nevada; Feb. 6-8, 2001.

* cited by examiner

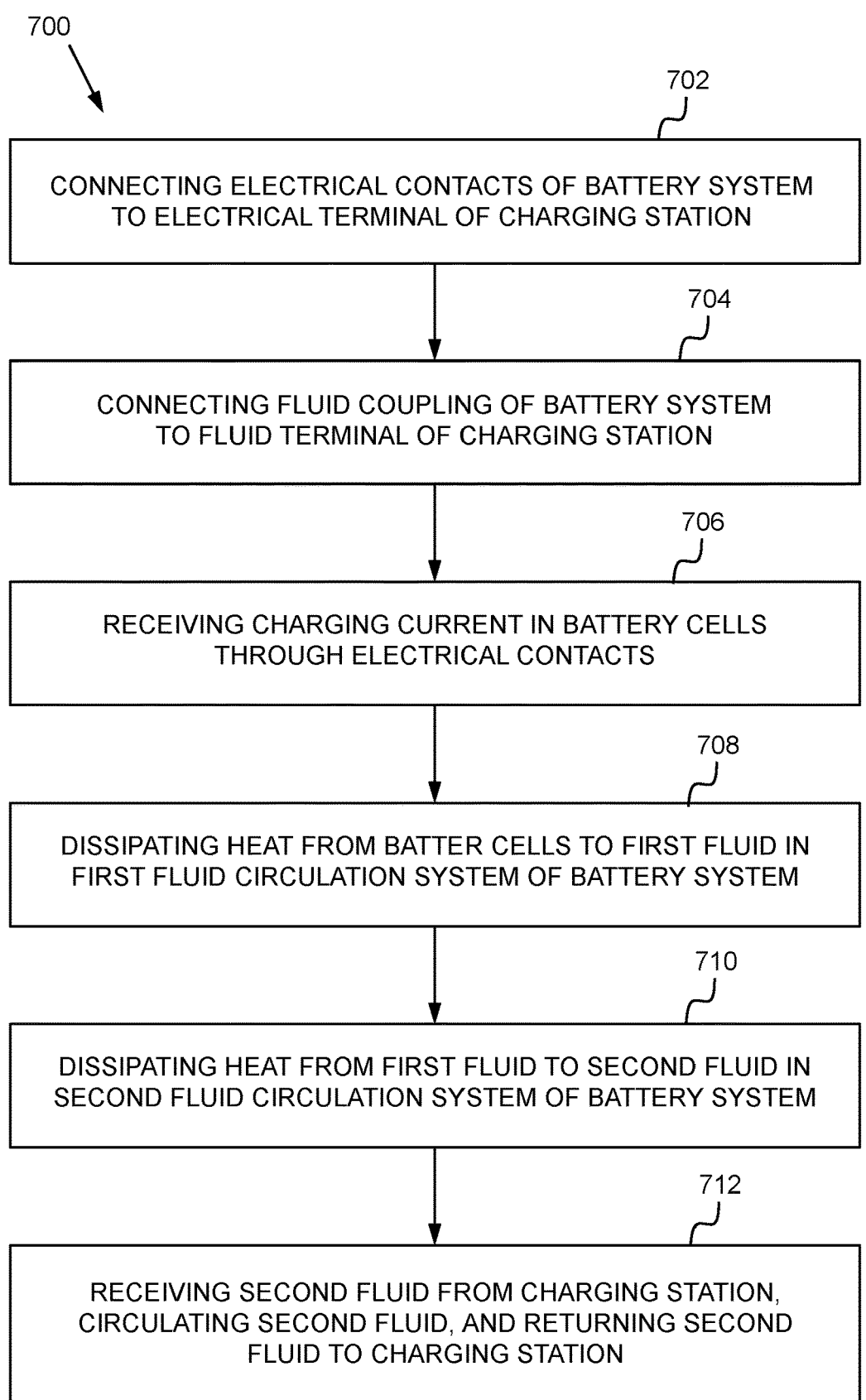

700

702

CONNECTING ELECTRICAL CONTACTS OF BATTERY SYSTEM
TO ELECTRICAL TERMINAL OF CHARGING STATION

704

CONNECTING FLUID COUPLING OF BATTERY SYSTEM
TO FLUID TERMINAL OF CHARGING STATION

706

RECEIVING CHARGING CURRENT IN BATTERY CELLS
THROUGH ELECTRICAL CONTACTS

708

DISSIPATING HEAT FROM BATTER CELLS TO FIRST FLUID IN
FIRST FLUID CIRCULATION SYSTEM OF BATTERY SYSTEM

710

DISSIPATING HEAT FROM FIRST FLUID TO SECOND FLUID IN
SECOND FLUID CIRCULATION SYSTEM OF BATTERY SYSTEM

712

RECEIVING SECOND FLUID FROM CHARGING STATION,
CIRCULATING SECOND FLUID, AND RETURNING SECOND
FLUID TO CHARGING STATION

FIG. 7

THERMAL MANAGEMENT OF BATTERY SYSTEMS

CROSS REFERENCE TO RELATED APPLICATIONS

This application is a National Phase application of, and claims the benefit of, International (PCT) Application No. PCT/EP2020/084181, filed Dec. 1, 2020, which claims priority to GB Application No. 2000389.3, filed Jan. 10, 2020, each of which is hereby incorporated by reference in its entirety.

BACKGROUND

Batteries store energy in order to provide power to electrical devices when needed. As current is delivered to or drawn from the batteries, most batteries will generate heat. If the heat that is generated is not dissipated the battery will rise in temperature. Most batteries have an effective operating temperature range, and if the battery exceeds the maximum operating temperature, the batteries can become ineffective or even fail. In some cases, after a slight rise in temperature, a battery may be able to dissipate heat to its surroundings through a simple heat sink or without any thermal management. In other cases, a more specific thermal management system is needed to dissipate heat that is generated by the battery.

Typically, as the amount of current flowing into or out of the battery increases, the amount of heat that is generated also increases. Accordingly, thermal management of batteries can be particularly important during charging, when a large amount of current is fed into the batter, or when an electrical load demands high current output.

OVERVIEW

Disclosed herein are systems and methods for the thermal management of battery systems. Beneficially, the systems and methods utilize two fluids for controlling the temperature of battery cells in the battery systems.

Thus, in a first aspect, the present disclosure provides a battery system comprising:
- a plurality of battery cells including a first battery cell, each battery cell comprising a casing enclosing an anode and a cathode;
- a first fluid circulation system comprising a plurality of fluid conduits including a first fluid conduit that is adjacent to the first battery cell, wherein the first fluid circulation system is configured to circulate a first fluid through the battery system in a first direction; and
- a second fluid circulation system comprising a plurality of fluid conduits including a first fluid conduit that is adjacent to the first fluid conduit of the first fluid circulation system, wherein the second fluid circulation system is configured to circulate a second fluid through the battery system in a second direction that is opposite the first direction.

In one embodiment, each battery cell is a pouch cell.

In another embodiment, the first fluid is a dielectric fluid.

In another embodiment, the second fluid is a heat exchange fluid that has a higher thermal conductivity than the first fluid.

In another embodiment, the first fluid conduit of the first fluid circulation system is defined, at least in part, by the casing of the first battery cell, such that a fluid in the first fluid conduit is in fluidic contact with the first battery cell.

In another embodiment, the first fluid conduit of the first fluid circulation system and the first fluid conduit of the second fluid circulation system are separated by a shared conduit wall.

In another embodiment the plurality of battery cells includes a second battery cell,
- wherein the plurality of fluid conduits of the first fluid circulation system includes a second fluid conduit that is adjacent to the second battery cell, and
- wherein the first fluid conduit of the second fluid circulation system is interposed between the first fluid conduit of the first fluid circulation system and the second fluid conduit of the first fluid circulation system.

In another embodiment, a conduit wall between the first fluid circulation system and the second fluid circulation system includes a fire suppression passage configured to open when the conduit wall exceeds a predetermined temperature.

In another embodiment, the first fluid circulation system is configured to circulate the first fluid through the plurality of fluid conduits of the first fluid circulation system in series.

In another embodiment, the battery system further includes a pump configured to circulate the first fluid through the first fluid circulation system.

In another embodiment, the battery system further includes a controller configured to operate the pump so as to maintain the first fluid at an elevated pressure.

In another embodiment, the controller is configured to control the pump to adjust the pressure of the first fluid in order to control swelling of the plurality cells.

In another embodiment, the controller is configured to control a valve to adjust the pressure of the first fluid in order to control swelling of the plurality cells.

In a second aspect, the present disclosure provides a battery system comprising:
- a plurality of battery cells including a first battery cell, each battery cell comprising a casing enclosing an anode and a cathode;
- a first fluid circulation system comprising:
  - a pump configured to circulate a first fluid through the first fluid circulation system, and
  - a plurality of fluid conduits including a first fluid conduit that is defined, at least in part, by the casing of the first battery cell, such that the first fluid in the first fluid conduit is in fluidic contact with the first battery cell,
- a controller configured to operate the pump of the first fluid circulation system; and
- a second fluid circulation system comprising a plurality of fluid conduits including a first fluid conduit that is adjacent to the first fluid conduit of the first fluid circulation system, wherein the second fluid circulation system is configured to circulate a second fluid through the battery system.

In another embodiment, the controller is configured to control the pump to adjust the pressure of the first fluid in order to control swelling of the plurality cells.

In another embodiment, the controller is configured to control a valve to adjust the pressure of the first fluid in order to control swelling of the plurality cells.

In another embodiment, the pump is configured to circulate the first fluid through the battery system in a first direction, and the second fluid circulation system is configured to circulate the second fluid through the battery system in a second direction that is opposite the first direction.

In another aspect, the disclosure provides a method of charging an electric battery, the method comprising:

connecting electrical contacts of a battery system to an electrical terminal of a charging station;

connecting a fluid coupling of the battery system to a fluid terminal of the charging station;

receiving charging current in a plurality of battery cells through the electrical contacts;

dissipating heat from the battery cells to a first fluid in a first fluid circulation system of the battery system;

dissipating heat from the first fluid to a second fluid in a second fluid circulation system of the battery system; and receiving a flow of the second fluid from the fluid terminal of the charging station through the fluid coupling, circulating the second fluid through the second fluid circulation system, and returning the second fluid to the fluid terminal of the charging station through the fluid coupling.

In one embodiment of the method, the electrical contacts of the battery system and the fluid coupling of the battery system are disposed in a shared plug housing.

In another embodiment of the method, the method further includes circulating the first fluid through the first fluid circulation system.

In another embodiment of the method, the first fluid is maintained at an elevated pressure to limit swelling of each of the plurality of battery cells.

In another embodiment of the method, the method further includes sending sensor data to the charging station for controlling the flow of the second fluid through the second fluid circulation system.

These as well as other aspects, advantages, and alternatives, will become apparent to those of ordinary skill in the art by reading the following detailed description.

BRIEF DESCRIPTION OF THE DRAWINGS

The accompanying drawings are included to provide a further understanding of the systems and methods of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

FIG. 7 is a flow chart of a charging method according to an embodiment of the disclosure.

DETAILED DESCRIPTION

Figure 1:
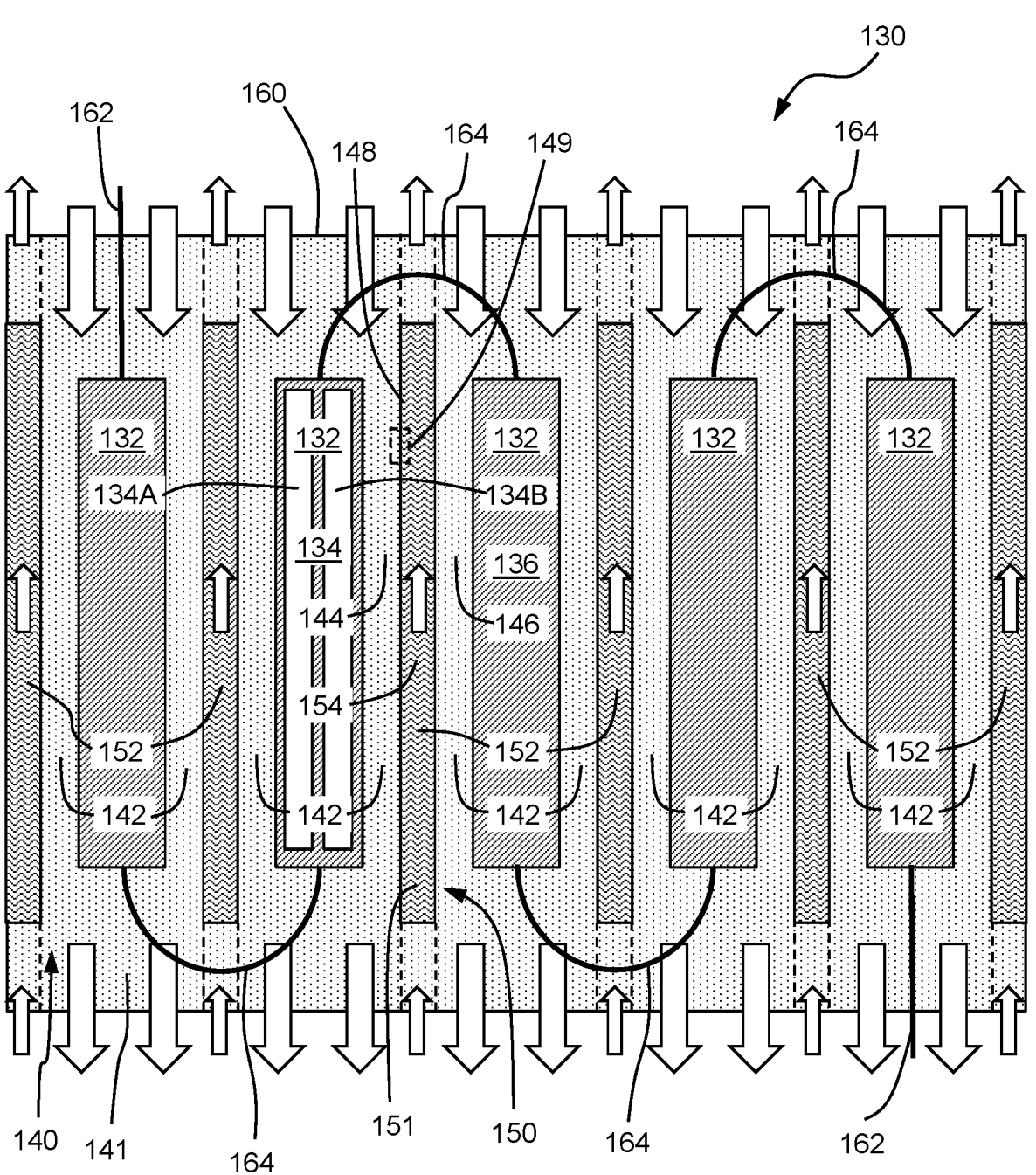
FIG. 1 is a schematic plan view of a battery system according to an embodiment of the disclosure.

Example systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, with respect to measurements, "about" means+/−5%.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

The systems and methods described herein are adapted for thermal management of batteries using two fluid circulation systems. As the battery cells in a battery system generate heat, the battery cells dissipate heat to a first fluid in a first fluid circulation system. In turn, the first fluid dissipates heat to a second fluid in a second fluid circulation system.

In some embodiments, the battery system may be part of a vehicle, such as an electric or hybrid vehicle. In other embodiments, the battery system may be part of a stationary energy storage device. For example, the battery system may be part of an energy storage system for delivering electrical energy to electric vehicles. As another example, the battery system may be part of an energy storage system that stores energy when surplus electrical energy is available. For example, the battery systems may be part of a wind farm or a solar energy system. Other uses for the battery system are also possible.

With reference to the Figures, FIG. 1 shows a battery pack 130 of a battery system (see FIG. 5) that has a plurality of battery cells 132 including a first battery cell 134. The first battery cell 134 may include an outer casing that encloses an anode 134A and a cathode 134B so as to form an electrical storage device. The battery pack 130 may also include a portion of a first fluid circulation system 140 and a portion of a second fluid circulation system 150. The first fluid circulation system 140 may be configured to circulate a first fluid through the battery pack 130. Further, the first fluid circulation system 140 may include fluid passages and components outside of the battery pack 130, as described in more detail below. To circulate fluid through the battery pack 130, the first fluid circulation system 140 may have a plurality of fluid conduits 142 including a first fluid conduit 144.

The first fluid conduit 144 of the first fluid circulation system 140 may be adjacent to the first battery cell 134, such that the first fluid 141 in the first fluid conduit 144 can absorb energy from or provide energy to the first battery cell 134. During operation of the battery system, as current is either delivered to or drawn from the battery cells 132, some energy may be converted to heat within the plurality of battery cells 132, including the first battery cell 134. As a result, the first battery cell 134 may rise in temperature. A temperature difference between the first battery cell 134 and the first fluid 141 in the first fluid conduit 144 may cause energy to be dissipated from the first battery cell 134 to the first fluid 141 in the first fluid conduit 144. The first fluid 141 in the other fluid conduits 142 of the first fluid circulation system 140 in the battery pack 130 may similarly absorb heat from respective adjacent battery cells 132. On the other hand, if the ambient environment is cold when the battery pack begins operation, the battery cells 132 may initially be cold. Accordingly, energy from the first fluid 141 in the first fluid conduit 144 can be transmitted to the battery cells in order to warm the battery cells.

Similar to the first fluid circulation system 140, the second fluid circulation system 150 may be configured to circulate a second fluid through the battery pack 130. Likewise, the second fluid circulation system 150 may include fluid passages and components outside of the battery pack, as described in more detail below. To circulate a second fluid 151 through the battery pack 130, the second fluid circulation system 150 may have a plurality of fluid conduits 152 including a first fluid conduit 154.

The first fluid conduit 154 of the second fluid circulation system 150 may be adjacent to the first fluid conduit 144 of the first fluid circulation system 140, such that the second fluid 151 in the first fluid conduit 154 of the second fluid circulation system 150 can absorb energy from the first fluid conduit 144 of the first fluid circulation system 140. As the first fluid 141 in the first fluid circulation system 140 absorbs energy from the battery cells 132 during operation of the battery system, the first fluid 141 in the first fluid conduit 144 may rise in temperature. A temperature difference between the first fluid 141 in the first fluid conduit 144 of the first fluid circulation system 140 and the second fluid 151 in the first fluid conduit 154 of the second fluid circulation system 150 may cause energy to be dissipated from the first fluid 141 to the second fluid 151 in the first fluid conduit 154 of the second fluid circulation system 150. Again, the other fluid conduits 152 of the second fluid circulation system 150 within the battery pack 130 may similarly absorb heat from respective adjacent fluid conduits 142 of the first fluid circulation system 140.

The first fluid circulation system 140 may be configured to circulate the first fluid 141 through the battery pack 130. In some embodiments, the first fluid circulation system 140 may include a pump to circulate the first fluid 141 through the first fluid circulation system 140 including the fluid conduits 142. The term pump, as used herein, includes any device that uses energy to move a fluid. For example, the pump can be formed by any actuator or mechanism that moves fluid, such as rotary, piston or other pumps. In other embodiments, the first fluid 141 may circulate through the first fluid circulation system 140 as a result of variations in temperature and convection, for example by thermo-syphoning.

Similarly, the second fluid circulation system 150 may be configured to circulate the second fluid 151 through the battery pack 130. In some embodiments, the second fluid circulation system 150 may include a pump to circulate the second fluid 151 through the second fluid circulation system 150 including the fluid conduits 152. In other embodiments, the second fluid 151 may circulate through the second fluid circulation system 150 as a result of variations in temperature and convection.

In some embodiments, the first fluid circulation system 140 may be configured to circulate the first fluid 141 through the battery pack 130 in a first direction and the second circulation system 150 may be configured to circulate the second fluid 151 through the battery pack 130 in a second direction that is opposite the first direction. The opposite direction of the flow of the respective fluids 141, 151 in the respective fluid circulation systems 140, 150 within the battery pack 130 may refer to the direction that the fluids are travelling within adjacent fluid conduits. For example, the first fluid 141 and the second fluid 151 may travel in opposite directions through neighboring fluid conduits such that the neighboring fluid conduits provide a counter flow arrangement. Such a configuration is shown in the embodiment of FIG. 1, where flow of the first fluid 141 through the first fluid conduit 144 of the first fluid circulation system 140 runs in the opposite direction of the flow of the second fluid 151 through the first fluid conduit 154 of the second fluid circulation system 150.

Alternatively, the opposite direction of the flow of the respective fluids 141, 151 in the respective fluid circulation systems 140, 150 within the battery pack 130 may refer to the overall direction that the fluids are travelling through the battery pack 130. For example, the first fluid circulation system 140 may be configured to circulate the first fluid 141 through the battery pack 130 in a serial flow configuration where the first fluid circulation system 140 is routed past a number of battery cells 132 in the battery pack 130, and flows from a first end of the battery pack 130 to a second end of the battery pack 130. Likewise, the second fluid circulation system 150 may be configured to circulate the second fluid 151 through the battery pack 130 in a serial flow in the opposite direction, i.e., from the second end of the battery pack 130 to the first end of the battery pack 130. In such an embodiment, immediately adjacent fluid conduits of the first and second fluid circulation systems may have parallel or cross flow configurations, while the overall flow of the first fluid 141 and second fluid 151 are in opposite directions. Still in other embodiments, the first and second fluid circulation systems 140, 150 may be configured to circulate the respective first and second fluids 141, 151 through the battery pack 130 without the flows being in opposite directions.

The battery pack 130 may include a housing 160 that holds the battery cells 132 as well as the fluid conduits 142 of the first fluid circulation system 140 and the fluid conduits of the second fluid circulation system 150. Further, the battery pack may also include electrical terminals 162 on the outside of the housing 160 for connecting the battery pack 130 to a power source or an electrical load. The battery pack 130 may further include electrical connections 164 that electrically connect the battery cells 132 within the battery pack 130. The electrical connections 164 may connect the battery cells 132 in series, in parallel, or in a combination, such as several battery cells 132 being connected in series to form a group, and the groups of battery cells connected in parallel.

The electrical connections may include any conductive structure to transfer current from one battery cell to another. For example, the electrical connections may include tabs that act as a terminal for each of the battery cells, which are connected to one another by wires or conductive bars. Other electrical connections are also possible.

In some embodiments the electrical connections 164 may be contained within the first fluid circulation system 140. For example, as shown in FIG. 1, the electrical connections 164 between the battery cells 132 in the battery pack 130 may be positioned within the first fluid circulation system 140, such that the first fluid 141 surrounds the electrical connections 164. Such a configuration allows any heat generated by the flow of current through the electrical connections 164 to be dissipated into the first fluid 141. Further, in some embodiments, the electrical connections 164 may pass through openings in the second fluid circulation system 150 so as to avoid interference between the electrical connections 164 and the second fluid circulation system 150. For instance, the fluid conduits 152 of the second fluid circulation system 150 may include sealed apertures therethrough, which allow the electrical connections 164 to cross the fluid conduits 152 without contacting the second fluid 151 in the second fluid circulation system 150. Further, in some embodiments, depending on the types of fluids used in the first fluid circulation system 140 and the second fluid circulation system 150, the electrical connections 164 may come in to contact with the first fluid 141 and/or the second fluid 151.

Figure 2:
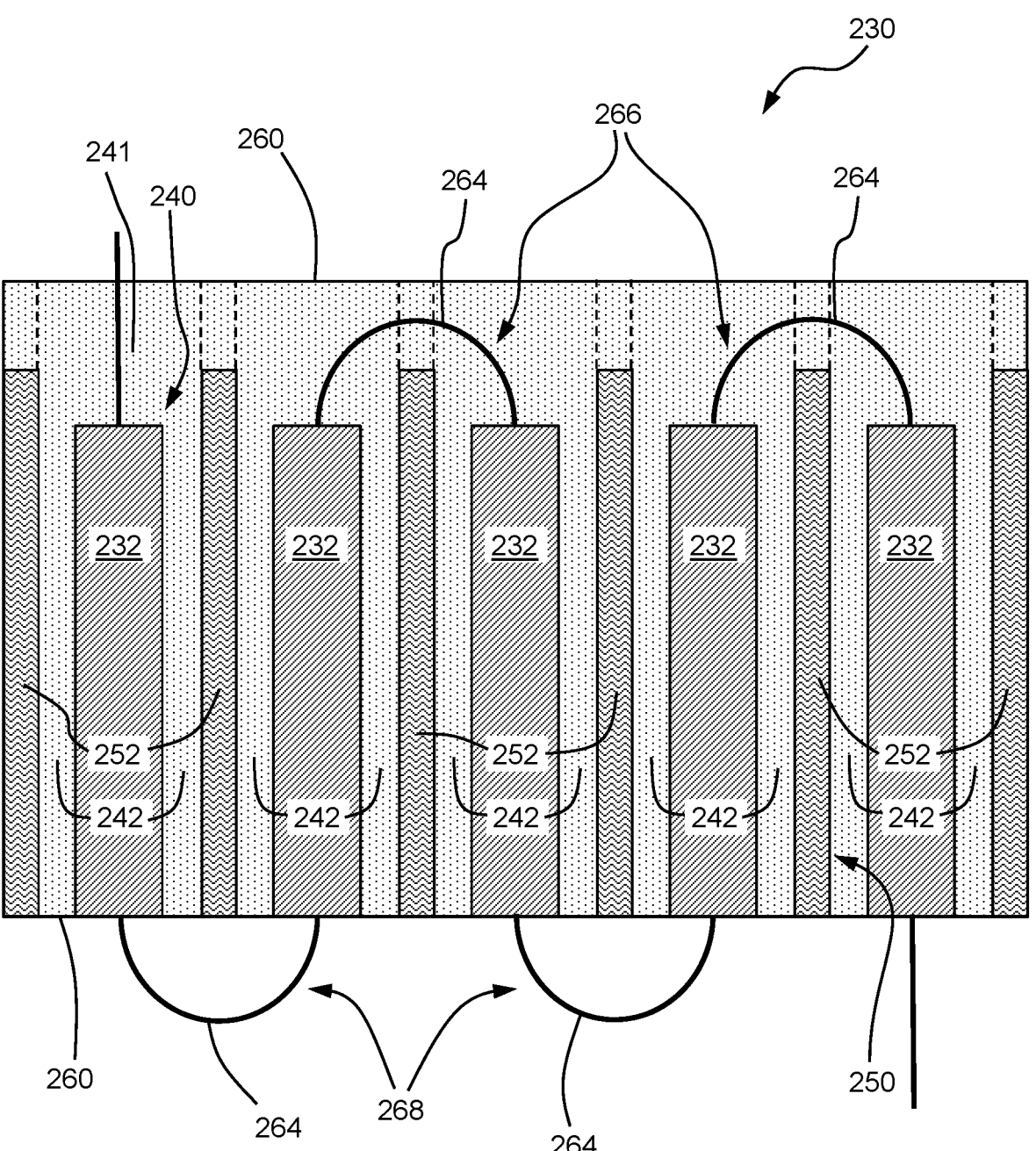
FIG. 2 is a schematic plan view of a battery system according to another embodiment of the disclosure.

In other embodiments, at least a portion of the electrical connections between the battery cells may be disposed on the outside of the housing of the battery pack. Such a battery pack is shown in FIG. 2. Battery pack 230 includes a plurality of battery cells 232 disposed within a housing 260. The battery pack 230 may also include fluid conduits 242 of a first fluid circulation system 240 and fluid conduits 252 of a second fluid circulation system 250. The fluid conduits 242 of the first fluid circulation system 240 and the fluid conduits 252 of the second fluid circulation system 250 may both also be disposed within the housing 260.

Electrical connections 264 may be provided that connect the battery cells 232 together. A first group 266 of the electrical connections 264 may be provided within the first fluid circulation system 240, such that the electrical connections 264 of the first group 266 are surrounded by the first fluid 241. Accordingly, the first fluid 241 may provide direct cooling of the electrical connections 264. Further, the battery cells 232 of the battery pack 230 may be positioned to one side of the battery pack 230 such that some electrical terminals of the battery cells 232 extend out of the housing 260. For example, a second group 268 of the electrical connections 264 may be disposed on the outside of the housing 260 of the battery pack 230 and connect the terminals of the battery cells 232 that extend out of the housing 260.

Figure 4:
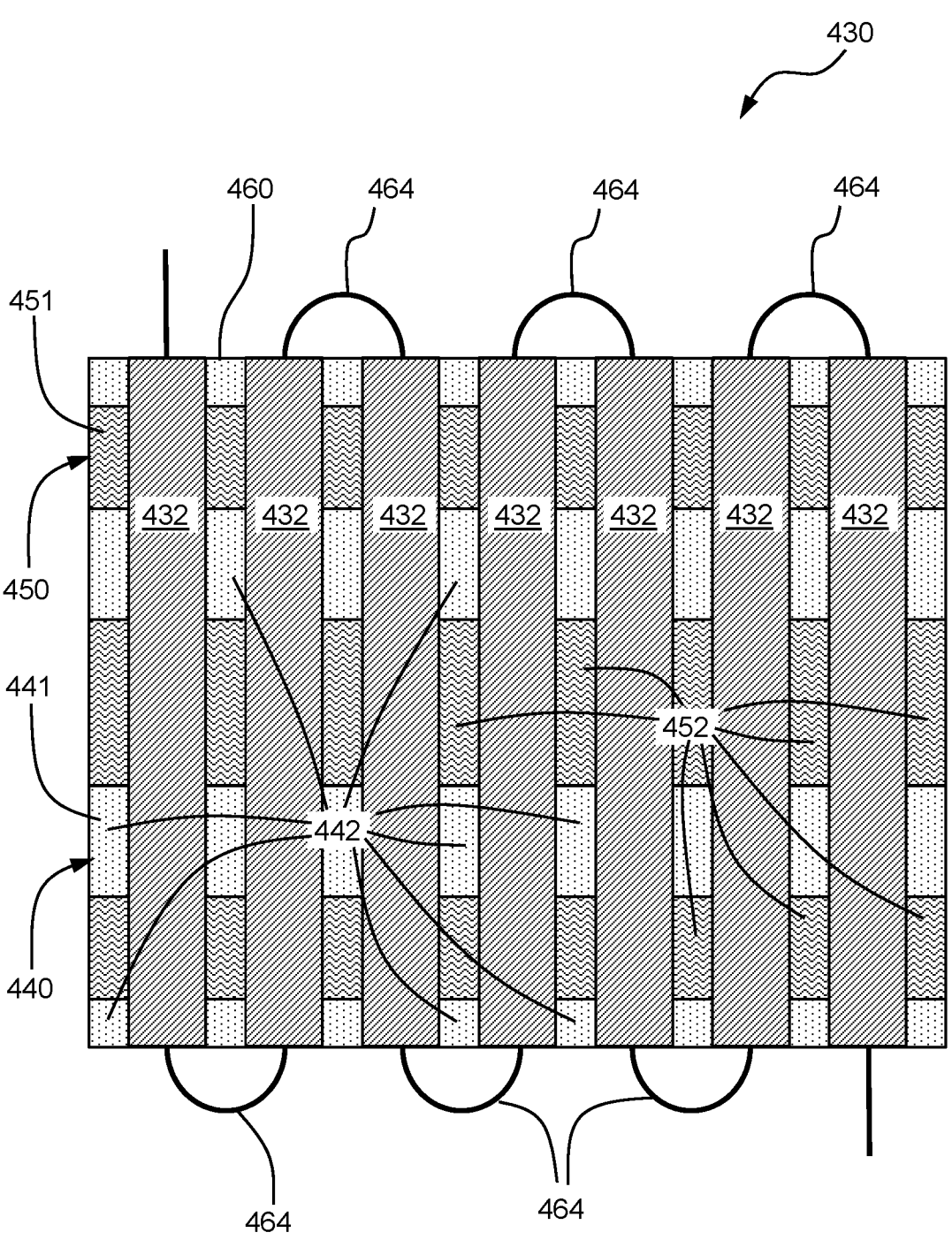
FIG. 4 is a schematic plan view of a battery system according to another embodiment of the disclosure.

Still, in other embodiments, all of the electrical connections between the battery cells may be disposed on the outside of the housing of the battery pack (for example, as shown in the embodiment of FIG. 4, which is described in more detail below).

In one embodiment, the battery cells 132 are pouch cells. For example, the casing of the battery cells 132 may be in the form of a pouch formed of a flexible material, such as a foil. Tabs that form the terminals for the battery cells 132 may be connected to the electrodes, e.g., 134A, 134B, within the casing and extend out of the casing for electrical connection to other battery cells 132. Further, the tabs may be sealed where they pass through the cell casing.

Figure 3:
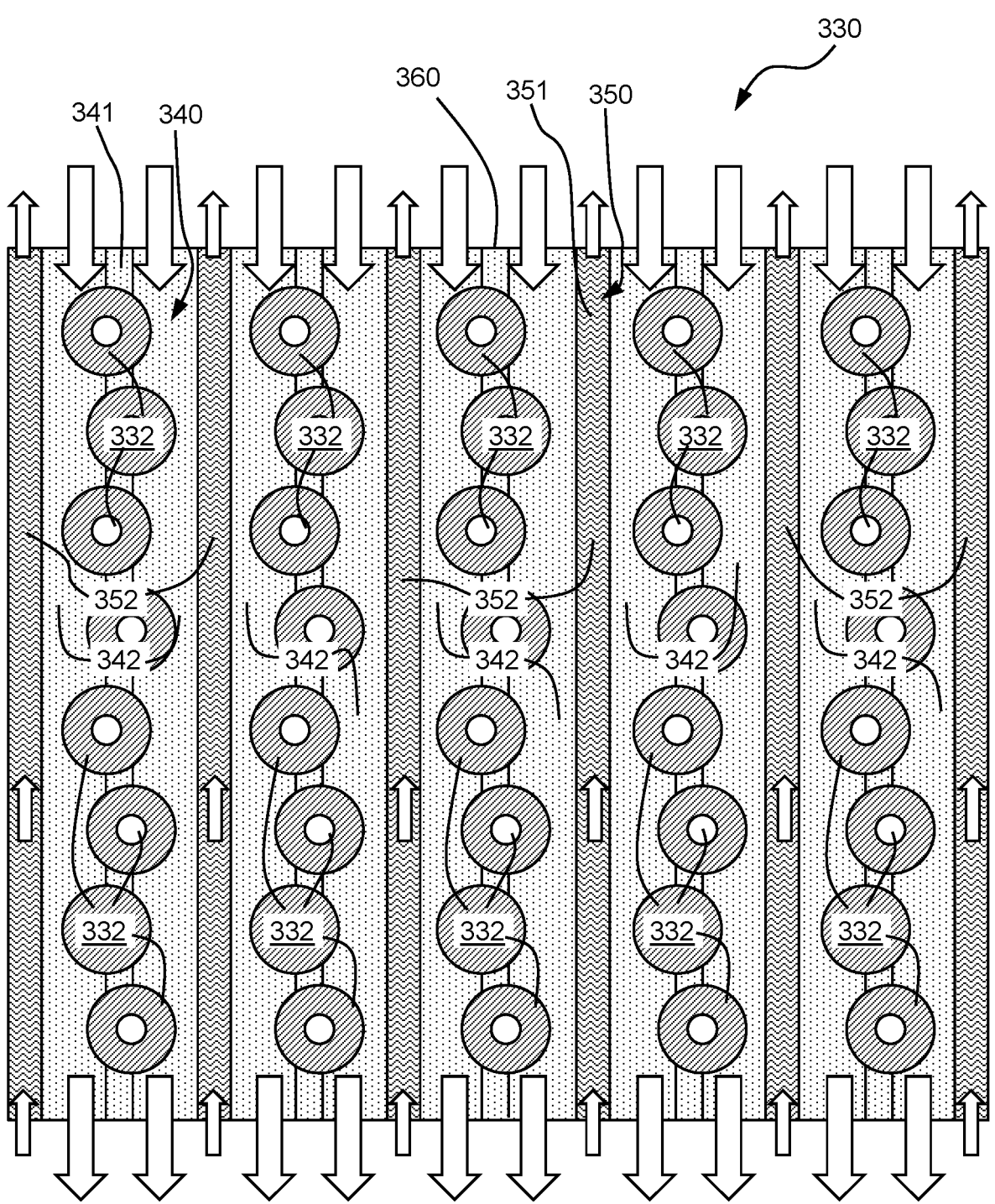
FIG. 3 is a schematic plan view of a battery system according to yet another embodiment of the disclosure.

In other embodiments, the battery cells may be prism cells or cylindrical cells. For example, an embodiment of a battery pack including cylindrical cells is shown in FIG. 3. Battery pack 330 may include a plurality of cylindrical battery cells 332 disposed within a housing 360. The cylindrical battery cells 332 may be arranged in rows that extend from one side of the housing to another. The battery pack 330 may also include fluid conduits 342 of a first fluid circulation system 340 and fluid conduits 352 of a second fluid circulation system 350. The fluid conduits 342 of the first fluid circulation system 340 and the fluid conduits 352 of the second fluid circulation system 350 may both also be disposed within the housing 360.

The cylindrical battery cells 332 may be positioned within cavities in the battery pack 330 that form a part of the first fluid circulation system 340. Accordingly, the fluid conduits 342 of the first fluid circulation system 340 may be formed around the cylindrical battery cells 332. As a result, each of the cylindrical battery cells may be surrounded by the first fluid 341 within the first fluid circulation system 340. As illustrated in the embodiment of FIG. 3, the fluid conduits 352 of the second fluid circulation system 350 may be provided between the cavities in which the cylindrical battery cells 332 are housed. In some embodiments, the positioning of the cylindrical battery cells 332 of each row may be staggered such that the fluid conduits 342 of the first fluid circulation system 340 have a meandering path. Such a configuration may help promote flow of the first fluid 341 in the first fluid circulation system 340 around the cylindrical battery cells 332.

In embodiments of the battery system, the first fluid 141 within the first fluid circulation system 140 may be a dielectric. Accordingly, conductive parts of the battery cells 132, such as terminals, can be in direct fluidic communication with the first fluid 141 without compromising the performance of the battery cells 132. The term dielectric, as used herein, includes various dielectric substances that are known in the art and can suitably be used in the systems and methods described herein. For example, embodiments of the first fluid may include aliphatics (e.g., C14-C50 alkyls, C14-C50 alkenyls, C14-C50 alkynyls, polyolefins such as poly-α-olefin), aliphatic oxygenates (e.g., ketones, ethers, esters, or amides), aromatics (e.g., dialkylbenzene such as diethylbenzene, cyclohexylbenzene, 1-alkylnaphthalene, 2-alkylnaphthalene, dibenzyltoluene, and alkylated biphenyl), aromatic oxygenates (e.g., ketones, ethers, esters, or amides), silicones (e.g., silicone oil and silicate ester), halocarbons and hydrohaloethers and any combination thereof. In some embodiments the first fluid 141 may have a dielectric constant or relative permittivity of less than 6. Further, in some embodiments, the first fluid 141 may be a liquid dielectric having a mineral oil base. Other liquid dielectrics, including synthetic fluids, are also possible for use as the first fluid 141.

In some embodiments, the second fluid 151 within the second fluid circulation system 150 may be a different fluid than the first fluid 141 within the first fluid circulation system 140. For example, in some embodiments the second fluid 151 within the second fluid circulation system 150 may be a heat exchange fluid that has a higher thermal conductivity than the first fluid 141 in the first fluid circulation system 140. For example, the second fluid 151 may be a water-based solution with a higher thermal conductivity than the first fluid 141. In some embodiments, the second fluid 151 may have a thermal conductivity that is at least 0.2 W/m K higher than the thermal conductivity of the first fluid 141, for example, the second fluid 151 may have a thermal conductivity that is at least 0.4 W/m K higher than the thermal conductivity of the first fluid 141. Using a second fluid 151 with a higher thermal conductivity than the first fluid 141 may allow the battery system to more effectively control the temperature of the battery cells 132. In other embodiments, the first fluid 141 and the second fluid 151 may be the same fluid. In such embodiments, the respective flow of the first and second fluids 141, 151 may promote thermal management without differences in thermal conductivity.

In some embodiments, the fluid conduits 142 of the first fluid circulation system 140 are defined, at least in part, by the casing of the battery cells 132. For example, as shown in FIG. 1, the first fluid conduit 144 is defined by the casing of the first battery cell 134 on one side and a first conduit wall 146 on the other side. Using the casing of the first battery cell 134 to define part of the boundary of the first fluid conduit 144 results in fluidic contact of the first fluid 141 with the first battery cell 134, which promotes heat transfer between the first battery cell 134 and the first fluid 141 within the first fluid conduit 144. In addition to the casing of the battery cells 132 and any conduit walls, the fluid conduits 142 may also be defined by the housing 160 of the battery pack 130, or by other components. In other embodiments, the fluid conduits 142 of the first fluid circulation system 140 may be defined by an annular conduit wall. For example, in some embodiments, the fluid conduits 142 of the first fluid circulation system 140 may be formed by an elongate annular conduit wall, such as a pipe. Similarly, the fluid conduits 152 of the second fluid circulation system 150 may also be defined by conduit walls, by the casing of battery cells 132, by the housing 160 of the battery pack 130, or by other components.

In some embodiments, the fluid conduits 142 of the first fluid circulation system 140 and the fluid conduits 152 of the second fluid circulation system 150 may be divided by shared conduit walls. For example, shared conduit wall 148 divides the first fluid conduit 144 of the first fluid circulation system 140 and the first fluid conduit 154 of the second fluid circulation system 150. Accordingly, the shared conduit wall 148, which may be a single sheet, is in fluidic communication with the first fluid 141 in the first fluid conduit 144 of the first fluid circulation system 140 and is also in fluidic communication with the second fluid 151 in the first fluid conduit 154 of the second fluid circulation system 150. This shared conduit wall 148 reduces the thermal resistance between the first fluid 141 in the first fluid conduit 144 of the first fluid circulation system 140 and the second fluid 151 in the first fluid conduit 154 of the second fluid circulation system 150, which promotes heat transfer between the two fluid circulation systems 140, 150. In other embodiments the fluid conduits 142, 152 of each of the first fluid circulation system 140 and the second fluid circulation system 150 may have their own conduit walls that are thermally coupled to one another.

In some embodiments, the fluid conduits 142, 152 may have a layered configuration between the battery cells 132. In some embodiments, the path between two battery cells 132 in the battery pack 130 may pass through multiple conduits in a layered configuration. For example, as shown in FIG. 1, the battery cells 132 of battery pack 130 includes the first battery cell 134 and the second battery cell 136. Between the first battery cell 134 and the second battery cell 136 is a layered configuration of the conduits of the first fluid circulation system 140 and the second fluid circulation system 150. In particular, the first conduit 144 of first fluid circulation system 140 is disposed adjacent to the first battery cell 134 and the second fluid conduit 146 of the first fluid circulation system 140 is adjacent to the second battery cell 136. Further, the first fluid conduit 154 of the second fluid circulation system 150 is interposed between the first fluid conduit 144 and the second conduit 146 of the first fluid circulation system 140. Accordingly, energy from the first battery cell 134 is transferred to the first fluid conduit 144 of the first fluid circulation system 140, while energy from the second battery cell 136 is transferred to the second fluid conduit 146 of the first fluid circulation system 140. In turn, energy is transferred from each of the first fluid conduit 144 and the second fluid conduit 146 of the first fluid circulation system 140 to the first fluid conduit 154 of the second fluid circulation system 150 from either side.

In other embodiments, the fluid conduits may be arranged in a configuration that is layered along a length of the battery cells. Such an embodiment is shown in FIG. 4. Battery pack 430 may include a plurality of battery cells 432 disposed within a housing 460. The battery pack may also include electrical connections 462 between the battery cells 432 that are disposed on the outside of the housing 460. The battery pack 430 may also include fluid conduits 442 of a first fluid circulation system 440 and fluid conduits 452 of a second fluid circulation system 450. The fluid conduits 442 of the first fluid circulation system 440 and the fluid conduits 452 of the second fluid circulation system 450 may both also be disposed within the housing 460. The fluid conduits 442 of the first fluid circulation system 440 and the fluid conduits 452 of the second fluid circulation system 450 are arranged in a layered configuration along the length of each of the battery cells 432. As a result, fluid conduits 442 of the first fluid circulation system 440 as well as fluid conduits 452 of the second fluid circulation system 450 are both adjacent to each battery cell 432. This allows a more compact construction of the battery pack 430, as the distance between two neighboring battery cells 432 is the thickness of a single fluid conduit, i.e., either a fluid conduit 442 of the first fluid circulation system 440 or a fluid conduit 452 of the second fluid circulation system 450.

Similar to the other illustrated embodiments, in some embodiments the fluid conduits 452 of the second fluid circulation system 450 may each be surrounded by an annular conduit wall isolating the second fluid 451 from the battery cells 432, while the fluid conduits 442 of the first fluid circulation system 440 are partially defined by the casing of the battery cells 432, such that the first fluid 441 is in fluidic communication with the battery cells 432. In other embodiments the fluid conduits 442, 452 of both fluid circulation systems 440, 450 may be formed by annular conduit walls.

In some embodiments, the flow through the fluid conduits is horizontal. For example, the flow through the fluid conduits 142 of the first fluid circulation system 140 and through the fluid conduits 152 of the second fluid circulation system 150 of battery pack 130 may be horizontal, as illustrated by the directional arrows in FIG. 1. Likewise, the flow through the fluid conduits 342 of the first fluid circulation system 340 and through the fluid conduits 352 of the second fluid circulation system 350 of battery pack 330 may be also horizontal, as illustrated by the directional arrows in FIG. 3. On the other hand, in some embodiments, the flow through the fluid conduits is vertical. For example, the flow through the fluid conduits 242 of the first fluid circulation system 240 and through the fluid conduits 252 of the second fluid circulation system 250 of battery pack 230 may be vertical. Likewise, the flow through the fluid conduits 442 of the first fluid circulation system 440 and through the fluid conduits 452 of the second fluid circulation system 450 of battery pack 430 may be vertical.

In some embodiments, the battery pack 130 may include fire suppression features. For example, in some embodiments, a conduit wall between the first fluid circulation system and the second fluid circulation system may include a fire suppression passage configured to open when the conduit wall exceeds a predetermined temperature. For example, in some embodiments, the shared conduit wall 148 between the first fluid conduit 144 of the first fluid circulation system 140 and the first fluid conduit 154 of the second fluid circulation system 150 may include a fire suppression passage 149 that is normally closed. At a predetermined temperature, the fire suppression passage 149 may open, allowing the fluids to pass between the two fluid conduits 144, 154 in order to suppress any fires that may exist. For example, the fire suppression passage 149 may include a mechanical valve configured to open at a predetermined temperature. Likewise, in some embodiments, the fire suppression passage 149 may be plugged with a wax or another substance that melts at a predetermined temperature so as to open the fire suppression passage 149. Further, in some embodiments, the shared conduit wall 148 may be substantially thinner at the fire suppression passage 149 than in other areas, such that this section of the shared conduit wall 148 melts or otherwise opens at a predetermined temperature.

Figure 5:
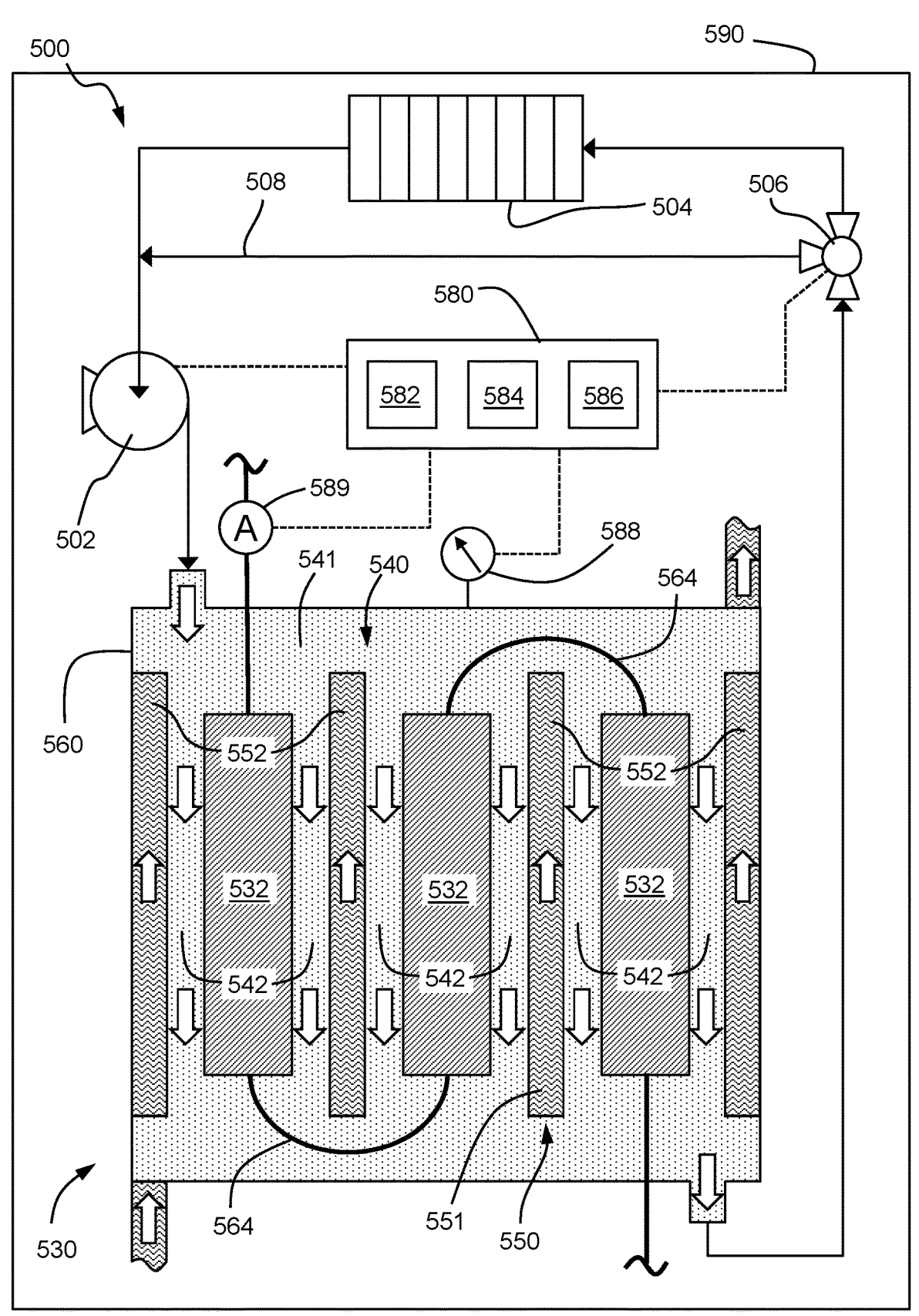
FIG. 5 is a schematic plan view of a battery system according to still another embodiment of the disclosure.

FIG. 5 illustrates a battery system 500 according to an embodiment of the disclosure. The battery system 500 may be part of an apparatus 590, such as a vehicle, and has a battery pack 530 that may be similar to any of the embodiments of FIGS. 1-4. In particular, the battery pack 530 may include a plurality of battery cells 532 disposed within a housing 560. Each of the battery cells 532 may include an anode and a cathode disposed within a casing. The battery pack may also include electrical connections 564 between the battery cells 532. The battery pack 530 may also include fluid conduits 542 of a first fluid circulation system 540 and fluid conduits 552 of a second fluid circulation system 550. The fluid conduits 542 of the first fluid circulation system 540 may be defined, at least in part, by the casing of the battery cells 532, such that a first fluid 541 within the first fluid circulation system 540 is in direct contact, i.e., fluidic contact, with the battery cells 532.

The first fluid circulation system 540 may also include a pump 502 configured to circulate the first fluid 541 through the first fluid circulation system 540. As stated above, the pump 502 may be any device that uses energy to move a fluid. For example, the pump 502 can be formed by any actuator or mechanism that moves fluid, such as a rotary, piston, or other pump design.

The first fluid circulation system 540 may also include a heat exchanger 504 configured to allow heat to be dissipated from the first fluid 541 within the first fluid circulation system. In some embodiments, the heat exchanger 504 may be within the apparatus 590. For example, in a case where the apparatus 590 is a vehicle, the heat exchanger 504 may be a radiator of the vehicle. In other embodiments, the heat exchanger 504 may be outside of the apparatus 590. For example, in some embodiments, the first fluid circulation system 540 may extend beyond the apparatus 590 to an external source that is configured to remove heat from the first fluid 541 of the first fluid circulation system 540. Likewise, in some embodiments, the first fluid circulation system 540 and second fluid circulation system 550 may be configured to transfer heat therebetween outside of the battery pack 530.

The first fluid circulation system 540 may also include a valve 506 configured to regulate the flow through the first fluid circulation system 540, including through the fluid conduits 542 within the battery pack 530. The valve 506 and pump 502 may be operated cooperatively to control the flow rate and pressure of the first fluid 541 in the first fluid circulation system 540, as described in more detail below. In some embodiments, the valve 506 may be coupled to a bypass control line 508 configured to bypass certain components of the first fluid circulation system 540. For example, the bypass control line 508 coupled to the valve 506 may be structured to bypass the heat exchanger 504, as shown in FIG. 5.

The battery system 500 may include a controller 580 configured to operate components of the first fluid circulation system 540 including the pump 502 and the valve 506. For example, the controller 580 may be configured to send control signals to the pump 502, for example, operable to increase the speed or power of the pump 502. Likewise, the controller 580 may be configured to send control signals to the valve 506, for example, operable to partially open, partially close, fully open, or fully close gates of the valve 506. In embodiments of the battery system 500, the second fluid circulation system 550 may also include a pump and/or a valve that is operable by control signals from the controller 580 so as to circulate the second fluid 551 through the second fluid circulation system 550.

The controller 580 may include a non-transitory computer-readable medium with program instructions stored thereon for performing the method of the disclosure. In some embodiments, the controller 580 may include at least one memory 582, at least one processor 584, and/or a network interface 586. Additionally or alternatively, in other embodiments, the controller 580 may include a different type of computing device operable to carry out the program instructions. For example, in some embodiments, the controller may include an application specific integrated circuit (ASIC) that performs processor operations, or a field-programmable gate array (FPGA).

While controller 580 of battery system 500 may be physically disposed within the apparatus 590, as shown in FIG. 5, in other embodiments, at least some portion of the controller 580 may be physically separated from the rest of the apparatus 590. For example, in some embodiments, one or more parts of the controller 580 may be remote from the apparatus 590 and communicate with the rest of the apparatus via the network interface 586. Further, in some embodiments, the controller 580 may be a client device, i.e., a device actively operated by the user, while in other embodiments, the controller 580 may be a server device, e.g., a device that provides computational services to a client device. Moreover, other types of computational platforms are also possible in embodiments of the disclosure.

The memory 582 is a computer-usable memory, such as random access memory (RAM), read-only memory (ROM), non-volatile memory such as flash memory, a solid state drive, a hard-disk drive, an optical memory device, and/or a magnetic storage device.

The processor 584 of controller 580 includes computer processing elements, e.g., a central processing unit (CPU), a digital signal processor (DSP), or a network processor. In some embodiments, the processor 584 may include register memory that temporarily stores instructions being executed and corresponding data and/or cache memory that temporarily stores performed instructions. In certain embodiments, the memory 582 stores program instructions that are executable by the processor 584 for carrying out the methods and operations of the disclosure, as described herein.

The network interface 586 provides a communications medium, such as, but not limited to, a digital and/or an analog communication medium, between the controller 580 and other computing systems or devices. In some embodiments, the network interface may operate via a wireless connection, such as IEEE 802.11 or BLUETOOTH, while in other embodiments, the network interface 586 may operate via a physical wired connection, such as an Ethernet connection. Still in other embodiments, the network interface 586 may communicate using another convention.

In some embodiments the controller 580 may be configured to operate the pump 502 and/or the valve 506 to adjust the pressure of the first fluid 541 in the first fluid circulation system 540. For example, the controller 580 may be configured to send a signal to the pump 502 to operate the pump at a higher power, likewise, the controller 580 may also be configured to send a signal to the valve 506 to partially close the valve 506. Accordingly, the volumetric flow through the first fluid circulation system 540 can be maintained or increased while also increasing pressure of the first fluid 541 within the battery pack 530.

In some embodiments, the controller 580 is configured to send control signals to the pump 502 so as to operate the pump 502 at an elevated pressure. For example, the controller 580 may operate the pump 502 to maintain a higher pressure in the first fluid circulation system 540 than is maintained in the second fluid circulation system 550. By operating the pump 502 at an elevated pressure, swelling of the battery cells 532 within the battery pack 530 can be regulated. The use of pressure of the first fluid 541 in the first fluid circulation system 540 to regulate swelling of the battery cells 532 in the battery pack 530 allows the battery cells 532 to be manufactured with thinner or lighter casing material. Because the fluid pressure of the first fluid 541 of the first fluid circulation system 540 may assist in controlling swelling of the battery cells 532, the casing walls of the battery cells 532 may be thinner. Accordingly, each battery cell 532 and the battery pack 530 as a whole may be lighter. For example, in some embodiments, the casing of the battery cells 532 may be a foil material, which may have a material thickness in a range from 0.05 millimeters to 0.4 millimeters. Despite using a thin foil material, the battery system 500 can control the swelling of the battery cells 532 through the pressure of the first fluid 541 in the first fluid circulation system 540.

In some embodiments, the controller 580 may receive sensor values from various sensors, and adapt the control signals sent to the pump 502 and/or valve 506 based on the values from the sensors. For example, the controller 580 may receive pressure values from a pressure sensor 588 and use a feedback loop to send control signals to the pump 502 and/or valve 506 based on the value received from the pressure sensor 588. Further, the controller 580 may receive values corresponding to the current flowing into or out of the battery pack 530 from an ammeter 589, and adjust control signals based on the received value from the ammeter 589.

In some embodiments, the apparatus 590 may be an electric, battery powered vehicle and the controller 580 may be configured to operate the pump 502 and/or the valve 506 based on the operating state of the vehicle. For example, during normal vehicle operation, the controller 580 may be configured to operate the pump 502 to circulate the first fluid 541 through the first fluid circulation system 540 so as to control the temperature of the battery cells 532 in the battery pack 530. Further, during normal vehicle operation, the controller 580 may be configured to hold the valve 506 in an open position so that the first fluid 541 circulates normally.

In some embodiments, during engine warm up from cold ambient temperatures, the controller 580 may, for example, be configured to operate the pump 502 so as to circulate the first fluid 541 through the first fluid circulation system 540 so as to control the temperature of the battery cells 532 of the battery pack, and be configured to operate the valve 506 such that the first fluid 541 passes through the bypass control line 508 so as to avoid the heat exchanger 504 and warm up more quickly.

Further, in some embodiments, during high operating loads of a vehicle, such as moving over hills or at fast speeds, the controller 580 may be configured to partially close the valve 506 to create an elevated pressure in the first fluid circulation system 540, and to operate the pump 502 to circulate the first fluid 541 through the first fluid circulation system 540 so as to control the temperature of the battery cells 532 of the battery pack. Likewise, during charging of the battery cells 532, the controller 580 may again be configured to partially close the valve 506 to create an elevated pressure in the first fluid circulation system 540, and to operate the pump 502 to circulate the first fluid 541 through the first fluid circulation system 540 so as to control the temperature of the battery cells 532 of the battery pack. The elevated pressure in the first fluid circulation system 540 during charging or high loads may be higher than the pressure in the first fluid circulation system 540 during normal operating conditions.

Figure 6:
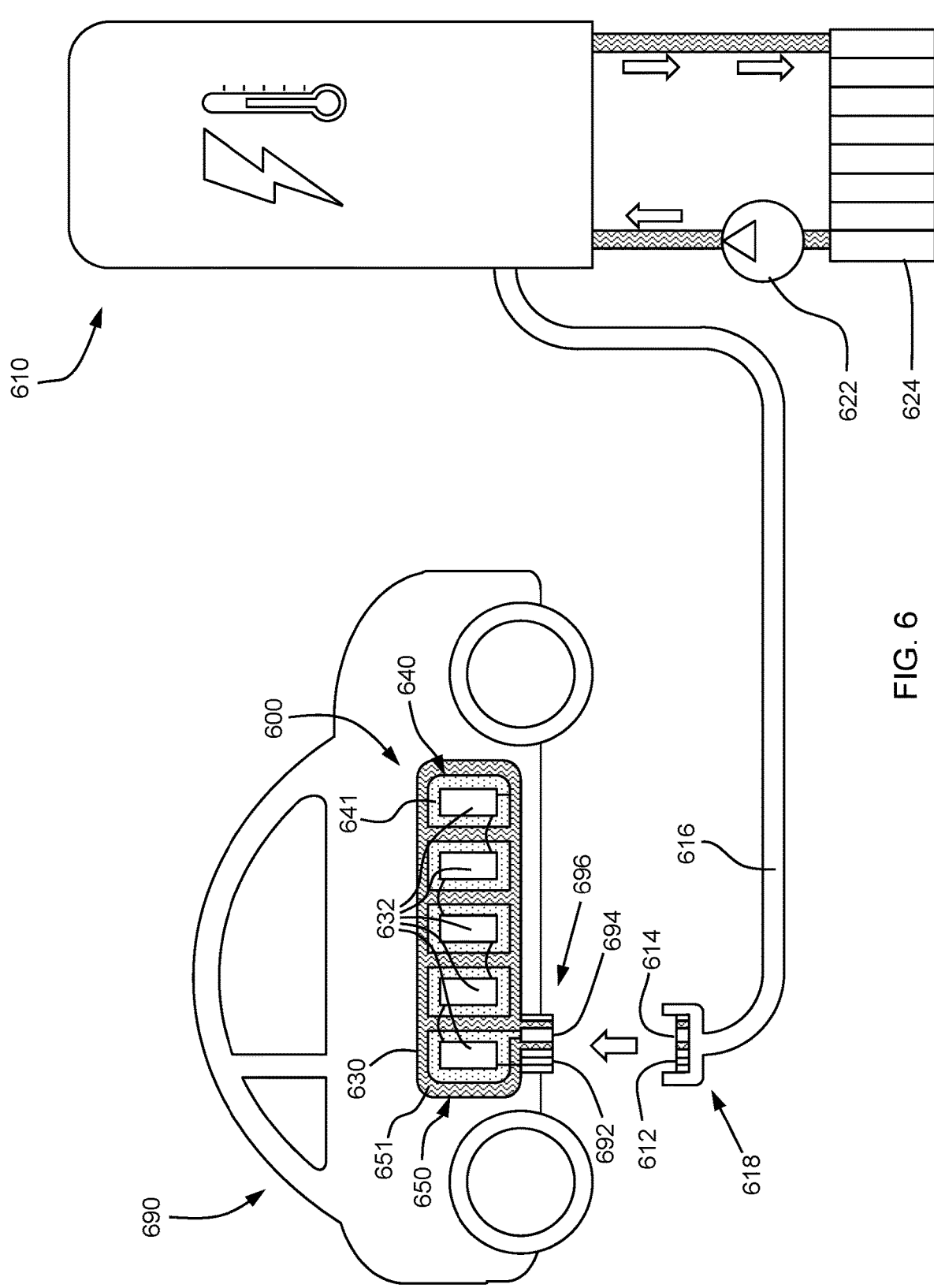
FIG. 6 is a schematic view of a vehicle charging system according to an embodiment of the disclosure.

FIG. 6 illustrates a charging station 610 for use with the battery system 600, according to an embodiment of the disclosure. The battery system 600 has a battery pack 630 that may include any of the features of the embodiments described above. For example, the battery pack 630 may include a plurality of battery cells 632, a first fluid circulation system 640 containing a first fluid 641 and a second fluid circulation system 650 containing a second fluid 651. Like the previously described battery systems, the first fluid circulation system 640 may include a plurality of fluid conduits 642 and the second fluid circulation system 650 may also include a plurality of fluid conduits 652.

The charging station 610 may be configured to provide electrical charge for the battery system 600 as well as assist with thermal management of the battery cells 632. For instance, the charging station 610 may include an electrical terminal 612 configured to couple to electrical contacts 692 of the battery system 600. The electrical contacts 692 of the battery system 600 may be electrically connected to the battery cells 632 of the battery pack 630. As a result, the charging station 610 is configured to provide charging current to the battery cells 632 of the battery pack 630 via the electrical terminal. The charging station 610 may also include a fluid terminal 614 on a fluid line 616 that is configured to couple to a fluid coupling 694 of the battery system 600. The fluid coupling 694 may be in fluid communication with the second fluid circulation system 650. Both the fluid line 616 and the fluid coupling 694 may include fluid supply and return paths. Accordingly, the charging station 610 is configured to circulate the second fluid 651 through the second fluid circulation system 650 and then receive the second fluid 651 that has cycled through the second fluid circulation system 650.

To provide circulation of the second fluid 651 through the second fluid circulation system 650, the charging station 610 may include a pump 622 in fluid communication with the fluid line 616. Further, the charging station 610 may also include a heat exchanger 624 so that the charging station 610 can deliver the second fluid 651 at a regulated temperature. In some embodiments, the heat exchanger 624 may be associated with a single charging station 610. In other embodiments, a plurality of charging stations may cycle the second fluid 651 through a large heat exchanger 624. Other components for controlling the pressure, temperature, and contents of the second fluid 651 may be included in the charging station 610. For example, the charging station 610 may include filters and monitors for assessing the quality of the fluid received from the vehicle 690.

In some embodiments, the electrical contacts 692 of the battery system 600 and the fluid coupling 694 of the battery system 600 may be disposed in a shared plug housing 696. Likewise, the electrical terminal 612 and the fluid terminal 614 of the charging station 610 may also be disposed in a shared plug housing 618. Accordingly, a user can connect both the electrical components and the fluid components of the charging station 610 to the battery system 600 in a single operation. In some embodiments, the shared plug housing 618 of the charging station may be disposed at the end of the fluid line 616, which may be in the form of a flexible pipe.

FIG. 7 shows an example embodiment of a method 700 of charging an electric battery. In some embodiments, the method 700 may be performed in connection with the battery system 600 and charging station 610 shown in FIG. 6. As shown by block 702, the method 700 may involve connecting a fluid coupling of the battery system to a fluid terminal of the charging station. Further, the method 700 may involve, as shown by block 704, receiving charging current in a plurality of battery cells through the electrical contacts. As shown by block 706, the method 700 may also involve dissipating heat from the battery cells to a first fluid in a first fluid circulation system of the battery system. Further, the method 700 may also involve dissipating heat from the first fluid to a second fluid in a second fluid circulation system of the battery system, as shown by block 708. Further still, as shown by block 710, the method 700 may involve receiving a flow of the second fluid from the fluid terminal of the charging station through the fluid coupling, circulating the second fluid through the second fluid circulation system, and returning the second fluid to the fluid terminal of the charging station through the fluid coupling.

In some embodiments, the method may further include sending sensor data from the vehicle 690 to the charging station 620 for controlling the flow of the second fluid 651 through the second fluid circulation system 650. For example, a control system or controller 680 of the vehicle 690, may send data collected from sensors within the vehicle or the fluid circulation systems. Such sensor data may include temperature information about the battery pack, pressure readings of the fluid in either the first or second fluid circulation systems, and electrical readings from the battery cells, such as current flow, stored charge and voltage. Based on the sensor data, the charging station 620 may adjust the flow of the second fluid 651 to the second fluid circulation system 650. For example, the charging station 620 may be configured to modify the speed of the pump 622 based on pressure readings in the second fluid circulation system 650.

The above detailed description describes various features and functions of the disclosed systems, devices, and methods with reference to the accompanying Figures. In the Figures, similar symbols typically identify similar components, unless context dictates otherwise. The illustrative embodiments described in the detailed description, Figures, and claims are not meant to be limiting. Other embodiments can be utilized, and other changes can be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A battery system comprising:
a plurality of battery cells including a first battery cell and a second battery cell, each battery cell comprising a casing enclosing an anode and a cathode;
a first fluid circulation system comprising a plurality of fluid conduits including a first fluid conduit that is adjacent to the first battery cell and a second fluid conduit that is adjacent to the second battery cell, wherein the first fluid circulation system is configured to circulate a first fluid through the battery system in a first direction; and
a second fluid circulation system comprising a plurality of fluid conduits including a first fluid conduit that is adjacent to the first fluid conduit of the first fluid circulation and is interposed between the first fluid conduit of the first fluid circulation system and the second fluid conduit of the first fluid circulation system, wherein the second fluid circulation system is configured to circulate a second fluid through the battery system in a second direction that is opposite the first direction.

2. The battery system according to claim 1, wherein each battery cell is a pouch cell.

3. The battery system according to claim 1, wherein the first fluid is a dielectric fluid.

4. The battery system according to claim 1, wherein the second fluid is a heat exchange fluid that has a higher thermal conductivity than the first fluid.

5. The battery system according to claim 1, wherein the first fluid conduit of the first fluid circulation system is defined, at least in part, by the casing of the first battery cell, such that a fluid in the first fluid conduit is in fluidic contact with the first battery cell.

6. The battery system according to claim 1, wherein the first fluid conduit of the first fluid circulation system and the first fluid conduit of the second fluid circulation system are separated by a shared conduit wall.

7. The battery system according to claim 1, wherein a conduit wall between the first fluid circulation system and the second fluid circulation system includes a fire suppression passage configured to open when the conduit wall exceeds a predetermined temperature.

8. The battery system according to claim 1, wherein the first fluid circulation system is configured to circulate the first fluid through the plurality of fluid conduits of the first fluid circulation system in series.

9. The battery system according to claim 1, further comprising a pump configured to circulate the first fluid through the first fluid circulation system.

10. The battery system according to claim 9, further comprising a controller configured to operate the pump so as to maintain the first fluid at an elevated pressure.

11. The battery system according to claim 10, wherein the controller is configured to control the pump to adjust the pressure of the first fluid in order to control swelling of the plurality cells.

12. The battery system according to claim 10, wherein the controller is configured to control a valve to adjust the pressure of the first fluid in order to control swelling of the plurality cells.

* * * * *